(12) United States Patent
Kutliroff et al.

(10) Patent No.: US 9,330,470 B2
(45) Date of Patent: May 3, 2016

(54) METHOD AND SYSTEM FOR MODELING SUBJECTS FROM A DEPTH MAP

(71) Applicants: Gershom Kutliroff, Alon Shrut (IL); Amit Bleiweiss, Moshav Meshan (IL); Itamar Glazer, Jerusalem (IL); Maoz Madmoni, Kibutz Bet Kamah (IL)

(72) Inventors: Gershom Kutliroff, Alon Shrut (IL); Amit Bleiweiss, Moshav Meshan (IL); Itamar Glazer, Jerusalem (IL); Maoz Madmoni, Kibutz Bet Kamah (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/135,388

(22) Filed: Dec. 19, 2013

(65) Prior Publication Data

US 2014/0177944 A1    Jun. 26, 2014

Related U.S. Application Data

(62) Division of application No. 12/817,102, filed on Jun. 16, 2010, now Pat. No. 8,639,020.

(51) Int. Cl.
*G06K 9/00*  (2006.01)
*G06T 7/00*  (2006.01)
*G06T 7/20*  (2006.01)

(52) U.S. Cl.
CPC .......... *G06T 7/0051* (2013.01); *G06K 9/00362* (2013.01); *G06T 7/0071* (2013.01); *G06T 7/2046* (2013.01); *G06T 2207/10028* (2013.01); *G06T 2207/30196* (2013.01)

(58) Field of Classification Search
CPC ............ G06T 15/00; G06T 7/20; G06K 9/78; G06K 9/00013
USPC ......... 382/154, 103, 243, 173, 181, 224, 118, 382/115, 132; 345/420
See application file for complete search history.

(56) References Cited

U.S. PATENT DOCUMENTS

| 4,900,033 A | 2/1990 | Campos et al. |
| 5,534,917 A | 7/1996 | MacDougall et al. |
| 5,994,844 A | 11/1999 | Crawford et al. |

(Continued)

FOREIGN PATENT DOCUMENTS

| CN | 1656503 A | 8/2005 |
| CN | 1656503 A | 8/2005 |

(Continued)

OTHER PUBLICATIONS

D. Hansen, et al., "In the Eye of the Beholder: A Survey of Models for Eyes and Gaze," IEEE Transactions on Pattern Analysis and Machine Intelligence, vol. 32, Issue 3,: Mar. 2010, pp. 478-500.

(Continued)

*Primary Examiner* — Manuchehr Rahmjoo
(74) *Attorney, Agent, or Firm* — Blakely, Sokoloff, Taylor & Zafman LLP

(57) ABSTRACT

A method for modeling and tracking a subject using image depth data includes locating the subject's trunk in the image depth data and creating a three-dimensional (3D) model of the subject's trunk. Further, the method includes locating the subject's head in the image depth data and creating a 3D model of the subject's head. The 3D models of the subject's head and trunk can be exploited by removing pixels from the image depth data corresponding to the trunk and the head of the subject, and the remaining image depth data can then be used to locate and track an extremity of the subject.

20 Claims, 10 Drawing Sheets

(56) References Cited

U.S. PATENT DOCUMENTS

| | | |
|---|---|---|
| 6,072,494 A | 6/2000 | Nguyen |
| 6,104,379 A | 8/2000 | Petrich et al. |
| 6,181,343 B1 | 1/2001 | Lyons |
| 6,256,033 B1 | 7/2001 | Nguyen |
| 6,270,414 B2 | 8/2001 | Roelofs |
| 6,336,891 B1 | 1/2002 | Fedrigon et al. |
| 6,632,158 B1 | 10/2003 | Nashner |
| 6,750,890 B1 | 6/2004 | Sugimoto |
| 6,788,809 B1 | 9/2004 | Grzeszczuk et al. |
| 6,941,239 B2 | 9/2005 | Unuma et al. |
| 7,027,083 B2 | 4/2006 | Kanade et al. |
| 7,038,855 B2 | 5/2006 | French et al. |
| 7,225,414 B1 | 5/2007 | Sharma et al. |
| 7,340,077 B2 | 3/2008 | Gokturk et al. |
| 7,369,685 B2 | 5/2008 | DeLean |
| 7,372,977 B2 | 5/2008 | Fujimura et al. |
| 7,379,563 B2 | 5/2008 | Shamaie |
| 7,421,369 B2 | 9/2008 | Clarkson |
| 7,538,744 B1 | 5/2009 | Liu et al. |
| 7,665,041 B2 | 2/2010 | Wilson et al. |
| 7,725,547 B2 | 5/2010 | Albertson et al. |
| 7,753,861 B1 | 7/2010 | Kahn et al. |
| 7,781,666 B2 | 8/2010 | Nishitani et al. |
| 7,789,800 B1 | 9/2010 | Watterson et al. |
| 7,815,507 B2 | 10/2010 | Parrott et al. |
| 7,840,031 B2 | 11/2010 | Albertson et al. |
| 7,843,425 B2 | 11/2010 | Lu et al. |
| 7,849,421 B2 | 12/2010 | Yoo et al. |
| 7,970,176 B2 | 6/2011 | Kutliroff et al. |
| 7,971,156 B2 | 6/2011 | Albertson et al. |
| 8,094,928 B2 | 1/2012 | Graepel et al. |
| 8,113,991 B2 | 2/2012 | Kutliroff |
| 8,228,315 B1 | 7/2012 | Starner |
| 8,319,865 B2 | 11/2012 | Lee et al. |
| 8,686,943 B1 | 4/2014 | Rafii |
| 2001/0016510 A1 | 8/2001 | Ishikawa et al. |
| 2003/0078138 A1 | 4/2003 | Toyama |
| 2003/0113018 A1* | 6/2003 | Nefian et al. ............... 382/181 |
| 2003/0134714 A1 | 7/2003 | Oishi et al. |
| 2003/0156756 A1 | 8/2003 | Gokturk et al. |
| 2004/0001113 A1 | 1/2004 | Zipperer et al. |
| 2004/0136564 A1 | 7/2004 | Roeber |
| 2004/0190776 A1 | 9/2004 | Higaki et al. |
| 2005/0227811 A1 | 10/2005 | Shum et al. |
| 2005/0231532 A1 | 10/2005 | Suzuki et al. |
| 2005/0271279 A1 | 12/2005 | Fujimura et al. |
| 2006/0018516 A1 | 1/2006 | Masoud et al. |
| 2006/0202953 A1 | 9/2006 | Pryor et al. |
| 2006/0215011 A1 | 9/2006 | P.S. et al. |
| 2007/0110296 A1 | 5/2007 | Graepel et al. |
| 2007/0110298 A1 | 5/2007 | Graepel et al. |
| 2007/0298883 A1 | 12/2007 | Feldman et al. |
| 2008/0122786 A1 | 5/2008 | Pryor et al. |
| 2008/0139307 A1 | 6/2008 | Ueshima et al. |
| 2008/0152191 A1* | 6/2008 | Fujimura et al. ............ 382/103 |
| 2008/0161997 A1 | 7/2008 | Wengelnik et al. |
| 2008/0192005 A1 | 8/2008 | Elgoyhan et al. |
| 2008/0225041 A1 | 9/2008 | El Dokor et al. |
| 2008/0244465 A1 | 10/2008 | Kongqiao et al. |
| 2008/0258921 A1 | 10/2008 | Woo et al. |
| 2009/0015681 A1 | 1/2009 | Pipkorn |
| 2009/0023555 A1 | 1/2009 | Raymond |
| 2009/0048070 A1 | 2/2009 | Vincent et al. |
| 2009/0055205 A1 | 2/2009 | Nguyen et al. |
| 2009/0077504 A1 | 3/2009 | Bell et al. |
| 2009/0085864 A1 | 4/2009 | Kutliroff et al. |
| 2009/0103780 A1 | 4/2009 | Nishihara et al. |
| 2009/0109795 A1 | 4/2009 | Marti |
| 2009/0113389 A1 | 4/2009 | Ergo et al. |
| 2009/0175540 A1 | 7/2009 | Dariush et al. |
| 2009/0232353 A1 | 9/2009 | Sundaresan et al. |
| 2009/0234614 A1 | 9/2009 | Kahn et al. |
| 2009/0262986 A1 | 10/2009 | Cartey et al. |
| 2009/0271821 A1 | 10/2009 | Zalewski |
| 2009/0298650 A1 | 12/2009 | Kutliroff |
| 2009/0315827 A1 | 12/2009 | Elvesjo et al. |
| 2009/0315978 A1 | 12/2009 | Wurmlin et al. |
| 2010/0034457 A1 | 2/2010 | Berliner et al. |
| 2010/0053151 A1 | 3/2010 | Marti et al. |
| 2010/0060570 A1 | 3/2010 | Underkoffler et al. |
| 2010/0066676 A1 | 3/2010 | Kramer et al. |
| 2010/0067181 A1 | 3/2010 | Bair et al. |
| 2010/0092031 A1 | 4/2010 | Bergeron et al. |
| 2010/0103093 A1 | 4/2010 | Izumi |
| 2010/0111370 A1* | 5/2010 | Black et al. ............... 382/111 |
| 2010/0134618 A1 | 6/2010 | Kim et al. |
| 2010/0208038 A1 | 8/2010 | Kutliroff et al. |
| 2010/0215257 A1* | 8/2010 | Dariush et al. ............. 382/159 |
| 2010/0241998 A1 | 9/2010 | Latta et al. |
| 2010/0303289 A1 | 12/2010 | Polzin et al. |
| 2010/0306699 A1 | 12/2010 | Hsu et al. |
| 2011/0075257 A1 | 3/2011 | Hua et al. |
| 2011/0080336 A1* | 4/2011 | Leyvand et al. ............. 345/156 |
| 2011/0085705 A1 | 4/2011 | Izadi et al. |
| 2011/0090407 A1 | 4/2011 | Friedman |
| 2011/0119640 A1 | 5/2011 | Berkes et al. |
| 2011/0134250 A1 | 6/2011 | Kim et al. |
| 2011/0134251 A1 | 6/2011 | Kim et al. |
| 2011/0164029 A1 | 7/2011 | King et al. |
| 2011/0193778 A1 | 8/2011 | Lee et al. |
| 2011/0221666 A1 | 9/2011 | Newton et al. |
| 2011/0234481 A1 | 9/2011 | Katz et al. |
| 2011/0249107 A1 | 10/2011 | Chiu |
| 2011/0262002 A1 | 10/2011 | Lee |
| 2011/0271235 A1 | 11/2011 | Doyen et al. |
| 2011/0304842 A1 | 12/2011 | Kao et al. |
| 2011/0310125 A1 | 12/2011 | McEldowney et al. |
| 2011/0316790 A1 | 12/2011 | Ollila et al. |
| 2011/0317871 A1 | 12/2011 | Tossell et al. |
| 2012/0038739 A1* | 2/2012 | Welch et al. ............ 348/14.01 |
| 2012/0038796 A1 | 2/2012 | Posa et al. |
| 2012/0050273 A1 | 3/2012 | Yoo et al. |
| 2012/0050483 A1 | 3/2012 | Boross et al. |
| 2012/0051588 A1* | 3/2012 | McEldowney ............. 382/103 |
| 2012/0062558 A1 | 3/2012 | Lee et al. |
| 2012/0069168 A1 | 3/2012 | Huang et al. |
| 2012/0119988 A1 | 5/2012 | Izumi |
| 2012/0176481 A1 | 7/2012 | Lukk et al. |
| 2012/0204133 A1 | 8/2012 | Guendelman et al. |
| 2012/0242796 A1 | 9/2012 | Ciurea et al. |
| 2012/0249741 A1 | 10/2012 | Maciocci et al. |
| 2012/0257035 A1 | 10/2012 | Larsen |
| 2012/0272179 A1 | 10/2012 | Stafford |
| 2012/0277594 A1 | 11/2012 | Pryor |
| 2012/0303839 A1 | 11/2012 | Jackson et al. |
| 2012/0309532 A1 | 12/2012 | Ambrus et al. |
| 2012/0313955 A1 | 12/2012 | Choukroun |
| 2012/0326963 A1 | 12/2012 | Minnen |
| 2012/0327218 A1 | 12/2012 | Baker et al. |
| 2013/0014052 A1 | 1/2013 | Frey et al. |
| 2013/0050425 A1 | 2/2013 | Im et al. |
| 2013/0050426 A1 | 2/2013 | Sarmast et al. |
| 2013/0055120 A1 | 2/2013 | Galor et al. |
| 2013/0139079 A1 | 5/2013 | Kitao et al. |
| 2013/0154913 A1 | 6/2013 | Genc et al. |
| 2013/0204408 A1 | 8/2013 | Thiruvengada et al. |
| 2013/0215027 A1 | 8/2013 | Van Lydegraf et al. |
| 2013/0222394 A1 | 8/2013 | Fyke |
| 2013/0249786 A1 | 9/2013 | Wang |
| 2013/0300659 A1 | 11/2013 | Kang et al. |
| 2013/0307771 A1 | 11/2013 | Parker et al. |
| 2013/0307773 A1 | 11/2013 | Yagishita |
| 2013/0336550 A1 | 12/2013 | Kapur et al. |
| 2014/0254883 A1 | 9/2014 | Kim et al. |

FOREIGN PATENT DOCUMENTS

| | | |
|---|---|---|
| CN | 101305401 A | 11/2006 |
| CN | 101305401 A | 11/2008 |
| EP | 2393298 | 12/2011 |
| EP | 253805 | 12/2012 |
| JP | 2002-41038 | 2/2002 |
| JP | 2007-316882 A | 12/2007 |
| JP | 200731882 | 12/2007 |

(56) References Cited

FOREIGN PATENT DOCUMENTS

| | | |
|---|---|---|
| JP | 2010-15553 | 1/2010 |
| JP | 2010-539590 | 12/2010 |
| JP | 2011-81480 | 4/2011 |
| JP | 2012-088688 | 5/2012 |
| KR | 2005-0066400 | 6/2005 |
| KR | 1020060070280 | 6/2006 |
| KR | 2006-0070280 | 12/2007 |
| KR | 2011-0032246 | 3/2011 |
| KR | 2012-0020045 | 3/2012 |
| KR | 2012/0031805 | 4/2012 |
| KR | 2013-0018464 | 2/2013 |
| WO | WO-9919788 A1 | 4/1999 |
| WO | WO-9919788 A1 | 4/1999 |
| WO | WO-0207839 A2 | 1/2002 |
| WO | WO-2005/114556 A2 | 12/2005 |
| WO | WO-2005114556 A2 | 12/2005 |
| WO | WO-2011036518 A2 | 3/2011 |
| WO | WO-2011036618 A2 | 3/2011 |

OTHER PUBLICATIONS

Extended European Search Report for EP Counterpart Application No. 12173256.4, 10 pgs., (Jul. 31, 2013).
Stefan Soutschek et al., "3-D Gesture-Based Scene Navigation in Medical Imaging Applications Using Time-of-Flight-Cameras" pp. 6, 2008.
Martin Haker "Scale-Invariant Range Features for the Time-of-Flight Camera Applications" pp. 6, 2008.
Alon, J., et al., "Accurate and Efficient Gesture Spotting vie Pruning and Subgesture Reasoning", Computer Vision in Human-Computer Interaction Lecture Notes in Computer Science, LNCS, Springer, Berlin, DE, pp. 189-198, Jan. 1, 2005.
Fujiki R., Arita D., and Taniguchi, R.: Real-time 3D hand shape estimation based on inverse kinematics and physical constrains. Proc ICIAP Springer LNCS 2005, Fabio Rolio and Sergio Vitulano (Eds.). 3817:850-858, 2005.
Hansen, D., et al., "In the Eye of the Beholder: A Survey of Models for Eyes and Gase," IEEE Transaction on Pattern Analysis and Machine Intelligence, vol. 32, Issue 3, pp. 478-500, Mar. 2010.
Keskin, C., et al., Real Time Hand Tracking and 3D Gesture Recognition for Interactive Interfaces Using HMM, Computer Engineering Dept. Bogazici Univeristy, pp. 1-4, 2003.
Lewis, J.P., et al., "Pose space deformations: A unified approach to shape interpolation and skeleton-driven deformation", Annual Conference Series, ACM SIGGRAPH, pp. 165-172, 2000.
Olkonomidis, I., et al., "Efficient Model-Based 3D Tracking of Hand Articulations using Kinect", $22^{nd}$ British Machine Vision Conference, pp. 1-11, Aug. 29-Sep. 2, 2011.
Pavlovis, V.I., et al., Visual Interpretation of Hand Gestures for Human-Computer Interaction: A Review, Department of Electrical and Computer Engineering, and The Beckman Institute for Advanced Science and Technology University of Illinois at Urban-Champaign, 36 pages, Jul. 1997.
Segen, J., et al., Fast and Accurate 3D Gesture Recognition Interface, AT&T Bell Laboratories, Holmdel, NJ 07733, pp. 86-91, Aug. 16-20, 1997.
Portillo-Rodriguez, O., et al., "Development of a 3D real time gesture recognition methodology for virtual environment control", Robot and Human Interactive Communication, 2008 Ro-Man 2008, The $17^{th}$ IEEE International Symposium on, IEEE, Piscataway, N.J., U.S. A. pp. 279-284, Aug. 1, 2008.
Zhu, Y., et al., "Controlled Human Pose Estimation from Dept H Image Streams" IEEE Computer Society Conference on Computer Vision and Pattern Recognition Workshops (CVPRW 08), pp. 1-8, see Abstract: Sections 2, 3, and 5. Figure 1, Jun. 23-28, 2008.
Extended Search Report with Supplementary Search Report and Search Opinion Mailed Jun. 18, 2013, for European Patent Application Number; EP 10744130 filed Feb. 4, 2010.
International Search Report and Written Opinion mailed Sep. 16, 2010, for International Application No. PCT/US2010/023179, filed Feb. 4, 2010, 7 pages.

International Search Report and Written Opinion mailed Feb. 28, 2013, for International Application No. PCT/US2012/047364, filed by Jul. 19, 2012. 11 pages.
Co-pending U.S. Appl. No. 11/666,280 by Kurtliroff, G., et al., filed Oct. 2, 2007.
Co-pending U.S. Appl. No. 12/392,879 by Kutliroff, G., et al., filed Feb. 25, 2009.
Co-pending U.S. Appl. No. 12/707,340 by Kutliroff, G., et al., filed Feb. 17, 2010.
Co-pending U.S. Appl. No. 12/817,102 by Kutliroff, G., et al., filed Jun. 16, 2010.
Co-pending U.S. Appl. No. 13/441,271 by Bleiweiss, A., et al., filed Apr. 6, 2012.
Co-pending U.S. Appl. No. 13/563,516 by Kutliroff, G., et al., filed Jul. 31, 2012.
Co-pending U.S. Appl. No. 13/768,835 Fleischmann, S., et al., filed Feb. 15, 2013.
Co-pending U.S. Appl. No. 13/785,669 by Kutliroff, G., et al., filed Mar. 5, 2013.
Notice of Allowance Mailed Mar. 15, 2011, in Co-pending U.S. Appl. No. 11/866,280 by Kutliroff, G., et al., filed Oct. 2, 2007.
Restriction Requirement Mailed Aug. 31, 2010, in Co-pending U.S. Appl. No. 12/392,879 by Kutliroff, G., et al., filed Feb. 25, 2009.
Non-Final Office Action Mailed Dec. 22, 2010, in Co-pending U.S. Appl. No. 12/392,879 by Kutliroff, G., et al., filed Feb. 25, 2008.
Final Office Action Mailed Jun. 10, 2011, in Co-pending U.S. Appl. No. 12/392,879 by Kutliroff, G., et al., filed Feb. 25, 2009.
Non-Final Office Action Mailed Mar. 23, 2012, in Co-pending U.S. Appl. No. 12/707,340 by Kutliroff, G., et al., filed Feb. 17, 2010.
Chu, Shaowel, and Jiro Tanaka, "Hand gesture for taking self portrait." Human-Computer Interaction, Interaction Techniques and Environments. Srpinger Berlin Heifelberg, 2011, 233-247.
Li, Zhi, and Ray Jarvis. "Real time hand gesture recognition using a range camera." Australasian Conference on Robotics and Automation, 2009.
Jenkinson, Mark, The Complete Idiot's Guide to Photography Essentials. Penguin Group, 2008. Safari Books Online. Web. Mar. 4, 2014.
Raheja, Jagdish L., Ankit Chaudhary, and Kunal Singal. "Tracking of fingertips and centers of palm using Kinect." Computational Intelligence, Modelling and Simulation (CIMSIM), 2011 Third International Conference on. IEEE, 2011.
"zoom, V.". OED Online. Dec. 2013. Oxford University Press. Mar. 4, 2014.
PCT Search Report and Written Opinion, PCT/US2013/052894, 11 pages, Nov. 12, 2013.
Gil, Pablo, Jorge Pomares, and Fernando Torres. "Analysis and adaptation of integration time in PMD camera for visual serving." Pattern Recognition (ICPR), 2010 $20^{th}$ International Conference on, IEEE, 2010.
Ziraknejad, N.; Lawrence, P.D.; Romilly, D.P., "The effect of Time-of-Flight camera integration time on vehicle driver head pose tracking accuracy." Vehicular Electronics and Safety (ICVES), 2012 IEEE International Conference on, vol., no., pp. 247, 254, Jul. 24-27, 2012.
Murino, V.; Regazzoni, C.S.; Foresti, G.L., "Real-time adaptive regulation of a visuai camera for automatic investigation of changing environments," Industrial Electronics, Control, and Instrumentation, 1993. Proceedings of the IECON '93., International Conference on, vol., no., pp. 1633, 1638 vol. 3, Nov. 15-18, 1993.
Murino, V.; Regazzoni, C.S., "Visual surveillance by depth from focus," Industrial Electronics, Control and Instrumentation, 1994. IECON '94., $20^{th}$ International Conference on, vol. 2, no., pp. 998, 1003 vol. 2, Sep. 5-9, 1994.
Murino, V.; Foresti, G.L.; Regazzoni, C.S., "Adaptive camera regulation for investigation of real scenes," Industrial Electronics, IEEE Transactions on, vol. 43, No. 5, pp. 588, 600, Oct. 1996.
Gil, P.; Pomares, J.; Torres, F., "Analysis and Adaptation of Integration Time in PMD Camera for Visual Servoing," Pattern Recognition (ICPR), 2010 $20^{th}$ International Conference on, vol., no., oo.311, 315, Aug. 23-26, 2010.
PCT Search Report and Written Opinion, PCT/US2013/065019, 10 pages, Jan. 24, 2014.
PCT Search Report and Written Opinion, PCT/US2014/013618, May 14, 2014 11 pages.

(56) References Cited

OTHER PUBLICATIONS

Murugappan et al., "Extended Multitouch: Recovering Touch Posture, Handedness, and User Identity using a Depth Camera", Proceedings of the 25th annual ACM symposium on User Interface Software and Technology, copyright ACM 2012, pp. 1-11.
D. Hansen, et al., "In the Eye of the Beholder: A Survey of Models for Eyes and Gaze," IEEE Transactions on Pattern Analysis and Machine Intelligence, vol. 32, Issue 3.: Mar. 2010, pp. 478-500.
PCT Search Report and Written Opinion, PCT/US2014/014440, May 22, 2014, 14 pages.
R. Balakrishnan et al., "User Interfaces for Volumetric Displays", Computer, vol. 34, No. 3, pp. 37-35, Mar. 2001.
Japanese Office Action, JP Application No. 201-140086, Apr. 22, 2015, 4 pages.
Alon, J., et al., "Accurate and Efficient Gesture Spotting via Pruning and Subgesture Reasoning", Computer Vision in Human-Computer Interaction Lecture Notes in Computer Science. LNCS, Springer, Berlin DEJan. 1, 2005 189-198.
Fujiki R., Anta D., and Taniguchi, R.: Real-time 3D hand shape estimation based on inverse kinematics and physical constraints. Proc ICIAP Springer LNCS 2005. Fabio Rollo and Sergio Vitulano (Eds.). 3817:650-858.
Hansen, D.W., et al., "In the Eye of the Beholder: A Survey of Models for Eyes and Gaze," IEEE Transactions on Pattern Analysis and Machine Intelligence, vol. 32, Issue 3.: Mar. 2010, pp. 478-500.
Keskin. C., et al., Real Time Hand Tracking and 3D Gesture Recognition for Interactive Interfaces Using HMM, Computer Engineering Dept. Bogazici University, 2003, pp. 1-4.
Lewis, J.P., et al., "Pose space deformations: A unified approach to shape interpolation and skeleton-driven deformation", Annual Conference Series, ACM SIGGRAPH, 2000, pp. 165-172.
Mackie, J., et al., "Finger Detection with Decision Trees, 2004. Proceedings of Image and Vision Computing New Zealand", pp. 399-403, 2004.
Oikonomida. I., et al., "Efficient Model-Based 3D Tracking of Hand Articulations using Kinect", BMVC 2009, pp. 1-11.
Pavlovic, V.I., et al., Visual Interpretation of Hand Gestures for Human-Computer Interaction: A Review, Department of Electrical and Computer Engineering, and The Beckman Institute for Advanced Science and Technology University of Illinois at Urbana-Champaign, Jul. 1997, 36 pages.
Portillo-Rodriguez, O., et al., "Development of a 3D real time gesture recognition methodology for virtual environment control", Robot and Human Interactive Communication, 2008 Ro-Man 2008, The 17th IEEE International Symposium On IEEE, Piscataway, N.J., U.S.A. Aug. 1, 2006, pp. 279-284.
Segen, J., et al., Fast and Accurate 3D Gesture Recognition Interface, AT&T Bell Laboratories Holmdel, NJ 07733, Aug. 16-20, 1997, pp. 86-91.
International Search Report and Written Opinion mailed Feb. 28, 2013, for International Application No. PCT/US2012/047364, filed Jul. 19, 2012, 11 pages.
Extended Search Report with Supplementary Search Report and Search Opinion Mailed Jun. 18, 2013 for European Patent Application No. EP 10744130 filed Feb. 4, 2010.
Co-pending U.S. Appl. No. 13/310,510 by Kutliroff, G., et al., filed Dec. 2, 2011.
Co-pending U.S. Appl. No. 13/441,271 by Bleiweiss, A., et al., filed Apr. 8, 2012.
Co-pending U.S. Appl. No. 13/532,609 by Kutlirofff, G., et al., filed Jun. 25, 2012.
Co-pending U.S. Appl. No. 13/552,978 by Yanai, Y., filed Jul. 19, 2012.
Co-pending U.S. Appl. No. 13/663,616 by Kutliroff, G., et al., filed Jul. 31, 2012.
Co-pending U.S. Appl. No. 13/652,181 by Yanai, Y., et al., filed Oct. 15, 2012.
Co-pending U.S. Appl. No. 13/676,017 by Kutliroff, G., et al., filed Nov. 13, 2012.
Co-pending U.S. Appl. No. 13/788,835 Fleischmann, S., et al., filed Feb. 15, 2013.
Co-pending U.S. Appl. No. 137785,689 by Kutilroff, G., et al., filed Mar. 5, 2013.
Co-pending U.S. Appl. No. 13/857,009 Fleischmann, S., et al., filed Apr. 4, 2013.
Notice of Allowance Mailed Mar. 15, 2011, in Co-Pending U.S. Appl. No. 11/886,280 by Kutliroff, G., et al., filed Oct. 2, 2007.
Restriction Requirement Mailed Aug. 31, 2010, in Co-pending U.S. Appl. No. 12/392,679 Kutliroff G., filed Feb. 25, 2009.
Non-Final Office Action Mailed Dec. 22, 2010, in Co-pending U.S. Appl. No. 12/392,879 Kutliroff G., filed Feb. 25, 2009.
Final Office Action Mailed Jun. 10, 2011, in Co-pending U.S. Appl. No. 12/392,679 by Kutliroff, G., filed Feb. 25, 2009.
Notice of Allowance Mailed Oct. 21, 2011, in Co-pending U.S. Appl. No. 12/392,879 by Kutliroff G. filed Feb. 25, 2009.
Non-Final Office Action Mailed Mar. 23, 2012, in Co-pending U.S. Appl. No. 12/707,340 by Kutliroff G., et al., filed Feb. 17, 2010.
Final Office Action Mailed Sep. 14, 2012, in Co-Pending U.S. Appl. No. 12/707,340 by Kutliroff, G., et al., filed Feb. 17, 2010.
Restriction Requirement Mailed Nov. 30, 2012, in Co-pending U.S. Appl. No. 12/817,102 by Kutliroff, G., et al., filed Jun. 16, 2010.
Non-Final Office Action Mailed Jan. 29, 2013, in Co-pending U.S. Appl. No. 12/817,102 by Kutliroff, G., et al., filed Jun. 16, 2010.
Notice of Allowance mailed Jul. 29, 2013, in Co-pending U.S. Appl. No. 12/817,102 by Kutliroff, G., et al., filed Jun. 16, 2010.
Co-pending U.S. Appl. No. 11/856,280, filed Oct. 2, 2007
Co-pending U.S. Appl. No. 12/392,879, filed Feb. 25, 2009.
Co-pending U.S. Appl. No. 12/707,340, filed Feb. 17, 2010.
Y. Zhu, B., Dariush, K., Fujimura, "Controlled Human Pose Estimation from Dept H Image Streams" IEEE Computer Society Conference on Computer Vision and Pattern Recognition Workshops (CVPRW 06), pp. 1-8, Jun. 23-28, 2008, See abstract; Sections 2, 3, and 5: figure 1.
International Search Report PCT/US2010/023179 dated Sep. 16, 2010, pp. 1-3.
Written Opinion PCT/US2010/023179 dated Sep. 16, 2010, pp. 1-4.

* cited by examiner

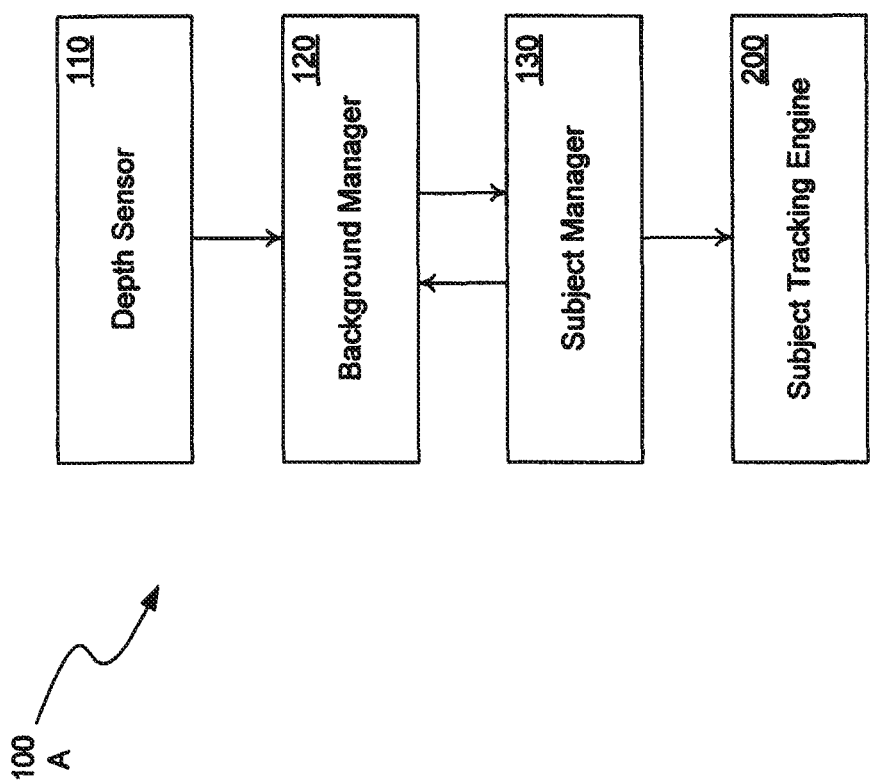

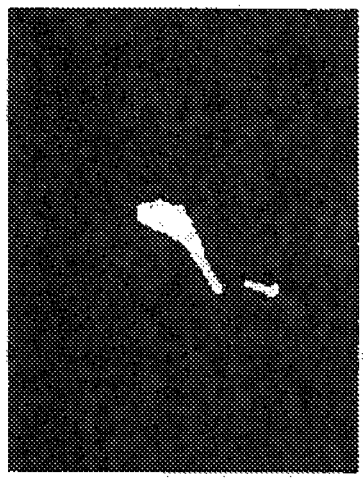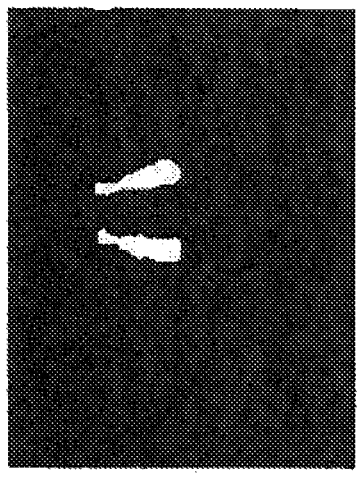
Fig. 6

METHOD AND SYSTEM FOR MODELING SUBJECTS FROM A DEPTH MAP

The present patent application is a Divisional application claiming priority from application Ser. No. 12/817,102, filed Jun. 16, 2010.

FIELD OF THE INVENTION

The present invention relates to tracking a subject using depth sensor technology, and more particularly, to tracking a subject employing a three-dimensional model for a trunk of the subject.

BACKGROUND

Capturing the movements of a subject is useful for many applications. For example, in the video game industry, movements of a player are used to control the movement and actions of a character in a game. The movement of a subject can also be used in the fields of motion pictures, automatic device control, security, and surveillance, to name a few. Identifying and tracking the movements of a subject is one of the primary objectives of the field of computer vision. Several different technologies have been created to track the movements of a subject.

The technology chosen to track the movement of a subject depends first on the purpose for tracking that subject. Further, the technology chosen depends on several other factors, such as the environment in which the subject is located, the ability to have the subject wear and/or use special equipment, and the desired precision of the tracking. For example, in the motion picture and computer animation industry, motion capture suits are used to track the positions of the subject's joints in high resolution. In home entertainment, video game consoles rely on data from controllers, or other devices, that the subject manipulates or interacts with to track the subject's movements. These devices use accelerometers and/or weight-measuring scales to obtain data about the subject's movements. However, relying on physical sensors and devices has obvious limitations, one of those being that special equipment must be held by or located on the subject. Alternatively, conventional video cameras have been employed to track the movements of a subject. However, robust and reliable joint tracking using conventional video cameras is a very challenging problem. Some of the challenges associated with using conventional video cameras include ambient light changes, segmentation problems, and occlusion.

SUMMARY

The techniques introduced here can be used to obtain or estimate positions of a subject's joints using image depth data taken of the subject, typically generated by one or more depth sensors. Techniques include locating and modeling a subject's trunk, using a location of the subject's trunk to locate and model the subject's head, and using the location of the subject's trunk and head to locate and model the subject's arms and legs. The techniques described here do not require explicit knowledge of the depth sensor's parameters (such as field-of-view of focal length) or orientation. Further, the techniques do not require a depth sensor calibration phase. Rather, the techniques construct and adapt a model of the subject automatically according to any arbitrary orientation and position of the subject. In addition, the techniques construct a model of the subject's articulation, based on the image depth data and the computation of the location of the subject's joints.

One possible result of the techniques described here is a three-dimensional model of the estimated positions of the subject's joints at a given point in time. The positions of the joints can be used as input into various applications, including tracking the path of a subject in some arbitrary space and translating one-to-one movements onto a character in a video game (as described, for example, in U.S. patent application Ser. No. 12/392,879, "Method and system for interactive fitness training program"). In addition, the positions of the joints can be used to recognize the subject's gestures (as detailed in U.S. patent application Ser. No. 11/866,280 and U.S. patent application Ser. No. 12/707,340).

BRIEF DESCRIPTION OF THE DRAWINGS

FIG. 1A is a block diagram of a system for tracking a subject according to the techniques introduced here.

FIG. 6 shows several examples of arm blobs obtained by using image depth data and the techniques introduced here.

DETAILED DESCRIPTION

Figure 1B:
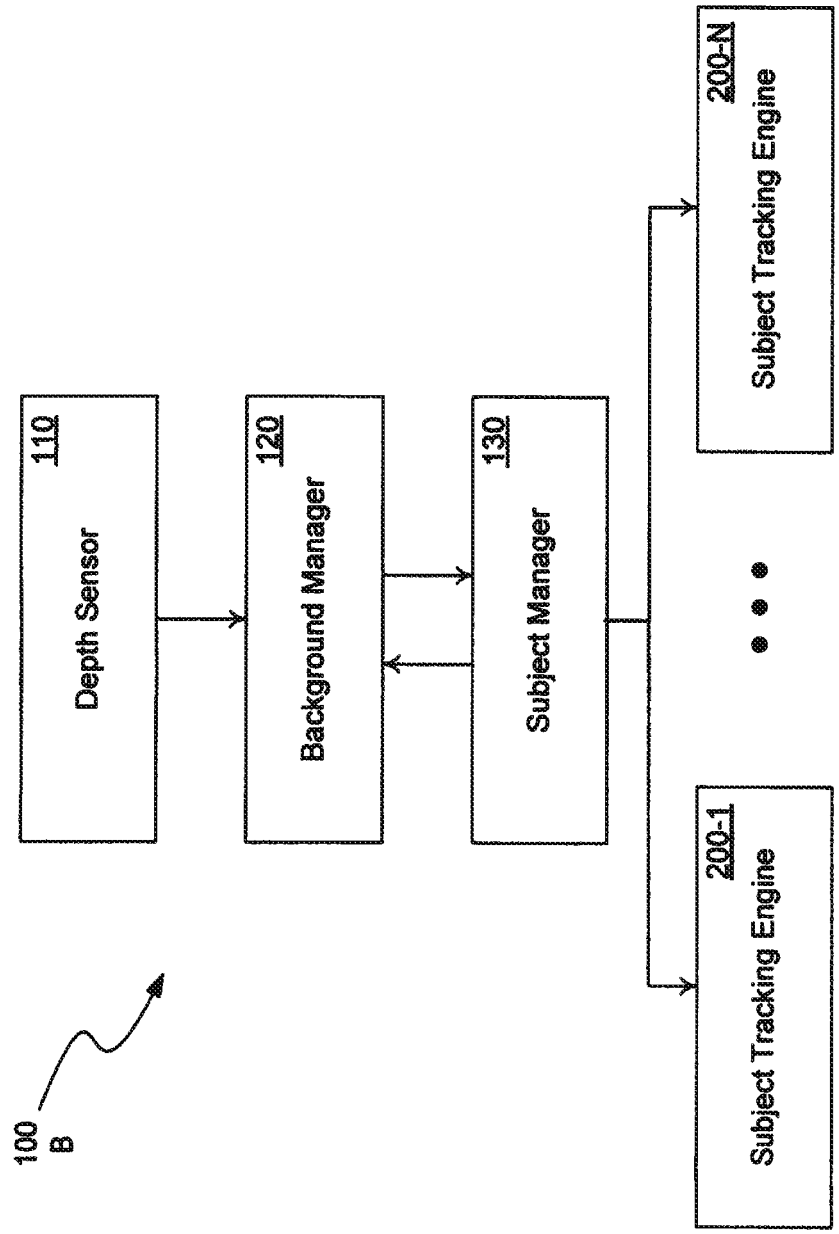
FIG. 1B is a block diagram of a system for tracking multiple subjects according to the techniques introduced here.

The techniques introduced here identify and track a subject's joints based on data obtained from depth sensors. With the limitations of previous methods taken into consideration, depth sensors have been introduced to track the movements of a subject. A depth sensor obtains the distance between the sensor and the objects in front of it. The data from a depth sensor can be useful in solving many of the problems regarding conventional video cameras discussed above.

A depth sensor is any sensor that obtains depth data for each pixel captured by the sensor, where depth refers to the distance between an object and the sensor itself. There are several different types of depth sensors, including sensors that rely on time-of-flight, structured light, or the use of laser speckle pattern technology. Stereoscopic cameras can also be used as a depth sensor. In every case, these sensors generate an image with a fixed resolution of pixels, where each pixel has a value (typically, an integer value), and these values represent the distance of the object projected onto a corresponding region of the image from the sensor. In addition to depth data, the sensors may also generate color data in a similar manner as conventional color cameras, and this data can be combined with the depth data for use in processing.

A binary mask can be created from the image using the depth data. A binary mask is an image of the same resolution as the original image, but all pixels have integer values corresponding to either 0 or 1. Typically, a threshold value is determined, and each pixel receives a value of 0 in the binary mask if the pixel value is below the threshold and 1 if the pixel value is above the threshold. For example, in the case of a subject standing in front of the depth sensor, the binary mask is generated (and thus the threshold computed) so that pixels corresponding to the subject's body are 1, and all other pixels are 0. Effectively then, the binary mask is the silhouette of the subject, as captured by the camera.

A blob is a collection of pixels of interest in the image depth data obtained from a depth sensor. Typically, a blob is a collection of connected pixels having similar values. For example, a blob can be the collection of pixels associated with the subject, or with a component of the subject, such as one extremity. An articulated figure is a collection of joints connected to each other in some pre-determined way and constrained to move in certain ways, e.g., a skeleton. For ease of explanation, the techniques introduced here refer to tracking a human form, however the process can be adapted to track other subjects, for example, an animal, using models that represent the motion of the subject.

In one embodiment, the techniques introduced here use an inverse kinematics (IK) solver. Given a desired configuration of an articulated figure (e.g., the positions of certain joints of a figure) an IK solver uses the desired configuration to compute the angles of the joints in the articulated figure in order to obtain the locations of the other joints of the figure. For example, for a human figure, given the locations of the wrist and shoulder, an IK solver can compute the angles of the shoulder and elbow joints that yield these wrist and shoulder locations. The IK solver thereby also effectively computes the location of the elbow joint.

FIG. 1A is a block diagram of a system for tracking a subject according to the techniques introduced here. The system 100 includes a depth sensor 110, a background manager 120, a subject manager 130, and a subject tracking engine 200. The block diagram also includes flow arrows to depict how image depth data is transferred from the depth sensor and how the image depth data is passed between the elements of the system 100.

The depth sensor 110 acquires data corresponding to the scene detected by the sensor. The image depth data from the depth sensor 110 is sent to the background manager 120, where the background of the image is separated from the foreground. The techniques introduced here relate to the data from the foreground of the image, which contains the pixels representing the subject. To facilitate the background subtraction that is done for every image obtained from the depth sensor, a model of the background is stored and updated regularly. The background manager 120 manages the model of the background using image depth data passed from the depth sensor 110, as well as the subject manager 130. Initially, the background manager 120 constructs a model of the background of the scene only from the image depth data sent from the depth sensor 110. Then the background model is dynamically updated using image depth data from the depth sensor 110 and data from the subject manager 130.

The background manager 120 separates the image depth data in the foreground from the background and sends the image depth data from the foreground to the subject manager 130. The subject manager 130 determines which blobs in the image depth data likely represent the subject. The subject manager 130 sends the image depth data that does not correspond to the subject back to the background manager 120 to be used in updating the background model. The blob(s) which the subject manager 130 has determined correspond to the subject are passed to the subject tracking engine 200.

The subject tracking engine 200 receives as an input, from the subject manager 130, a blob corresponding to one subject. If the subject manager 120 determines that different blobs correspond to different subjects, each blob is passed independently to the subject tracking engine 200. In one embodiment, the system includes multiple subject tracking engines 200. FIG. 1B is an example block diagram of a system 100A in which multiple subjects are tracked, and the blobs corresponding to each subject are passed independently to separate instances of the subject tracking engine 200-1 through 200-N.

Figure 2:
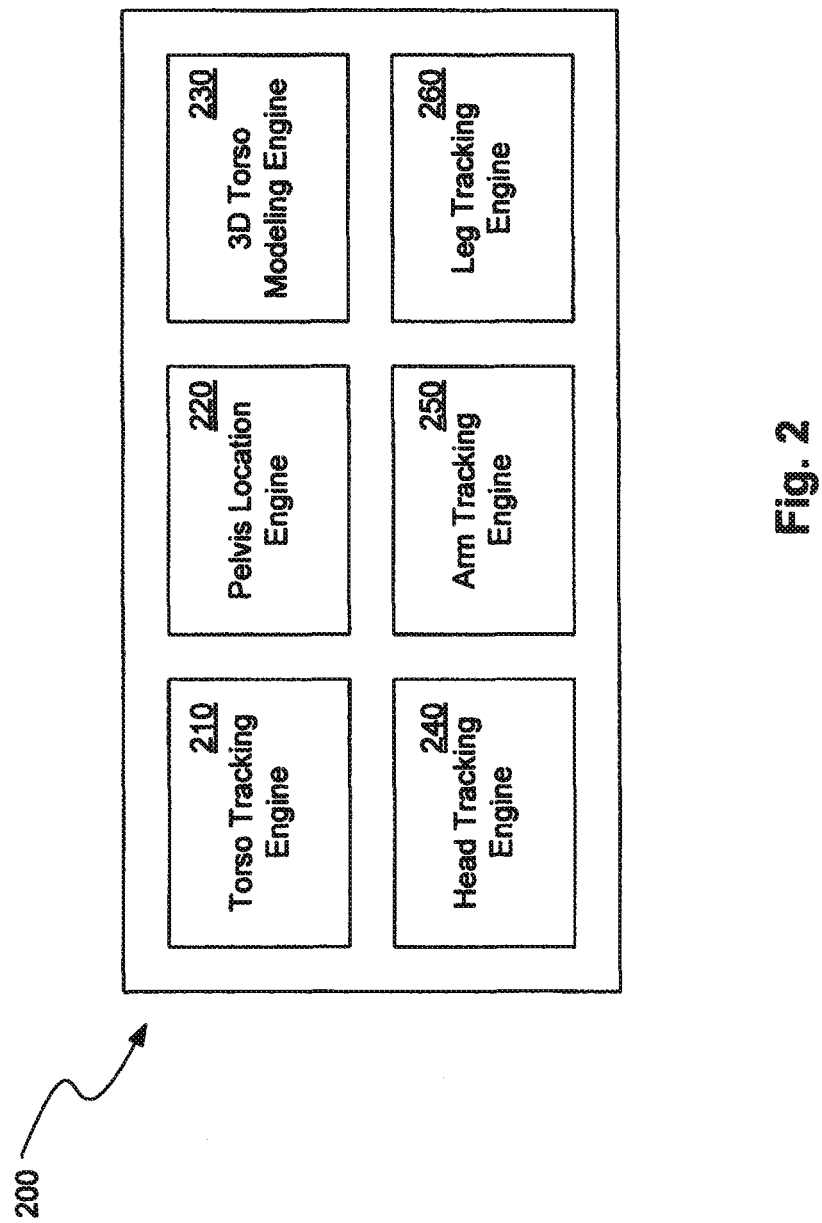
FIG. 2 is a block diagram of a subject tracking engine.

FIG. 2 is a block diagram of an example subject tracking engine 200. The subject tracking engine 200 includes a torso tracking engine 210, a pelvis location engine 220, a 3D (three-dimensional) torso modeling engine 230, a head tracking engine 240, an arm tracking engine 250, and a leg tracking engine 260. The various engines included in the subject tracking engine 200 can be implemented in software, hardware, firmware or a combination thereof. As described above, the subject tracking engine 200 receives a blob corresponding to a subject. The blob is a subset of the image depth data pixels obtained from the depth sensor.

Figure 3:
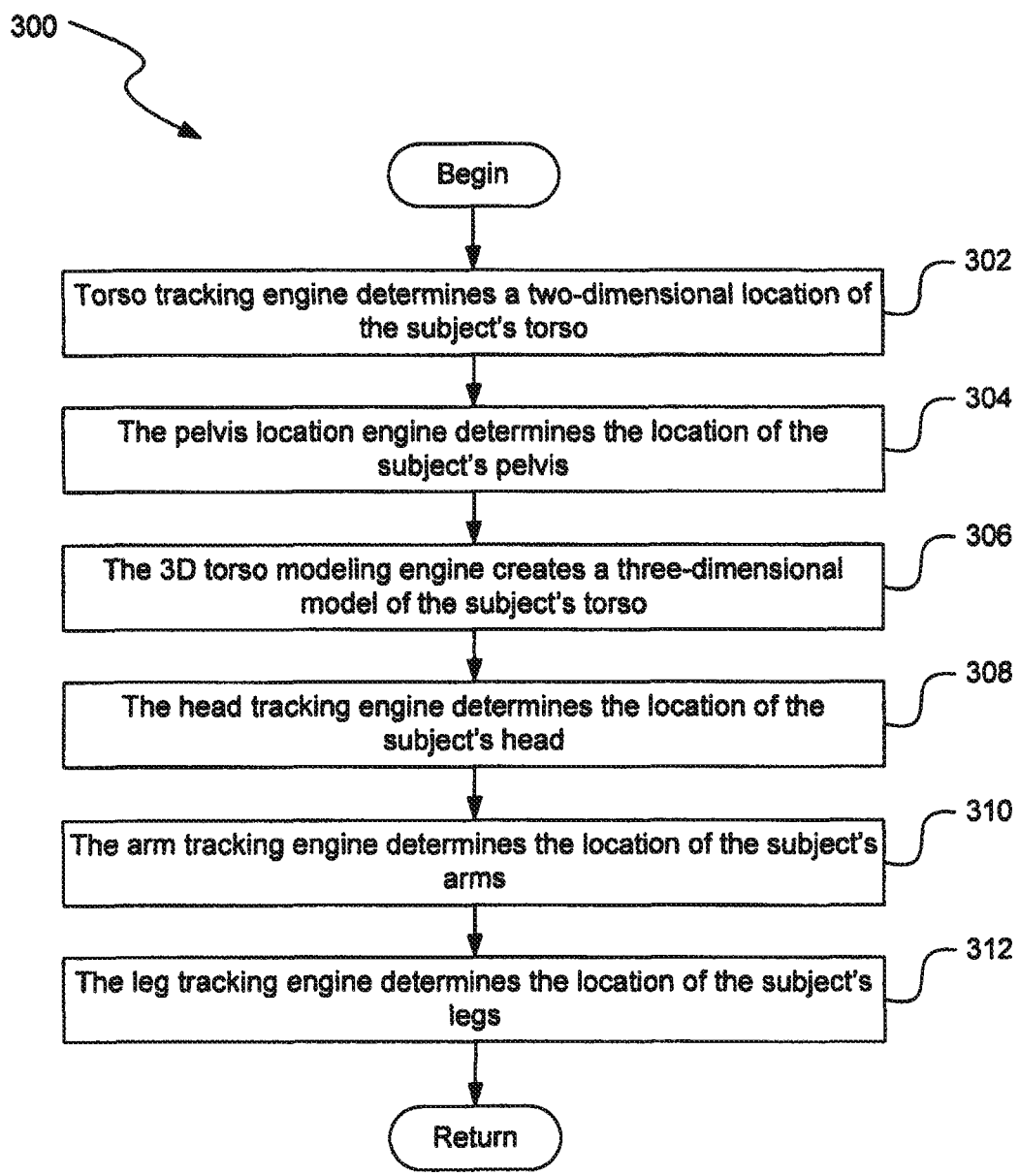
FIG. 3 is a flow diagram of a process for tracking a subject according to the techniques introduced here.

FIG. 3 is a flow diagram of a process for tracking a subject according to the techniques introduced here. The process is organized as a sequence of operations in the flowchart 300. However, it should be understood that at least some of the operations associated with this process can potentially be reordered, supplemented, or substituted for while still performing the same overall technique.

Initially, at 302, the torso tracking engine 210 determines a two-dimensional location of the torso, or trunk, of the subject in the image depth data received from the subject manager 130. The two-dimensional location of the torso does not take into account the depth information included in the image depth data. Initially, the torso tracking engine 210 estimates the location of the torso from the image pixels using ad hoc methods. However, once the location of the torso has been identified using ad hoc methods, the torso tracking engine 210 tracks the torso in subsequent frames using a motion model representative of the movement of a human torso in conjunction with the image depth data received from the subject manager 130.

The two-dimensional location of the torso of the subject and the blob representing the subject are passed to the pelvis location engine 220. At 304, the pelvis location engine 220 uses the two-dimensional location of the torso and the blob representing the subject to determine the two-dimensional location of the pelvis of the subject.

The location of the pelvis, torso, and the image depth data are passed to the 3D torso modeling engine, where, at 306, a three-dimensional model of the subject's torso is constructed. The 3D torso modeling engine 306 uses the depth component of the image depth data to construct the three-dimensional model. Thus, the model is a true three-dimensional model having location information on three axes. When using a two-dimensional model, the extremities are not distinguishable from the torso, and the result is the inclusion of at least part of the extremities with the torso. However, with a three-dimensional model of the torso, the extremities can be distinguished from the torso, even if the extremities are positioned in front of the torso, due to the depth information in the pixels. The three-dimensional model of the torso can be either parametric or non-parametric. In one embodiment, the three-dimensional model of the torso is a parametric cylinder model, and the parameters of the cylinder are computed using a least-squares approximation based on the image depth data corresponding to the torso of the subject.

Figure 4:
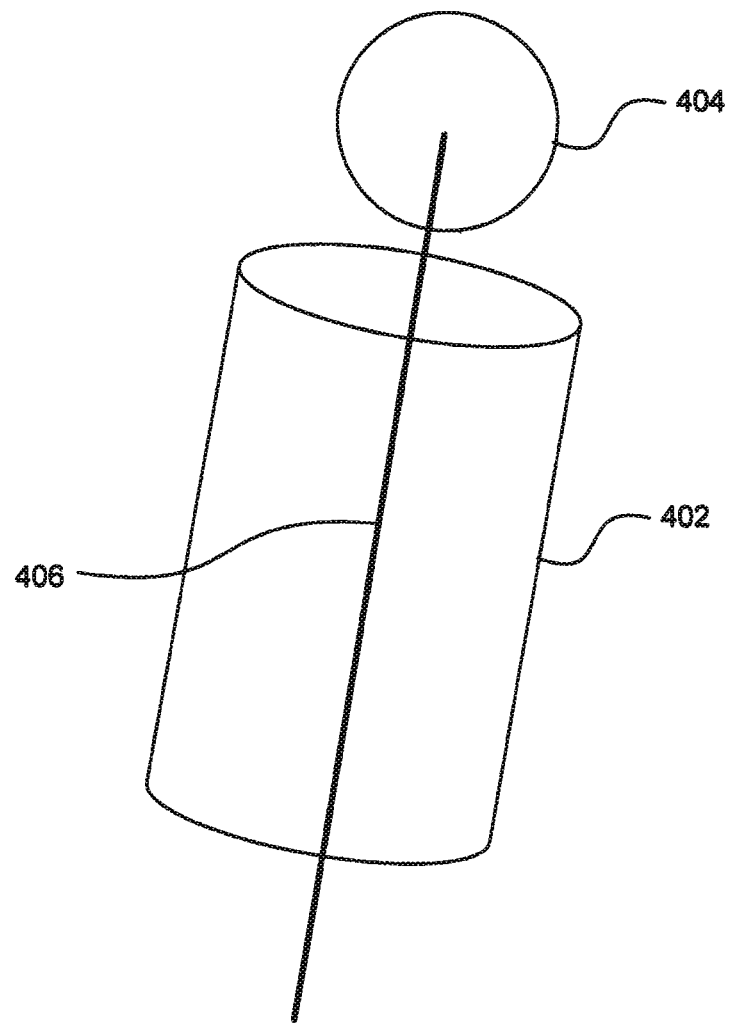
FIG. 4 is a diagram of an example three-dimensional model of a torso and a head of a human subject.

Once a three-dimensional model of the torso has been constructed, the model is passed, along with the blob representing the subject, to the head tracking engine 240. At 308, the head tracking engine 240 locates the head of the subject using the three-dimensional model of the torso and the blob representing the subject. There are several strong assumptions that can be used to assist in locating the head of the subject, for example, searching for the head based on the orientation of the major axis of the torso, and assuming that the head is located above the torso. FIG. 4, which is a diagram of an example three-dimensional model of a torso 402 and a head 404 of a human subject, shows how these assumptions can be exploited. The three-dimensional model of the torso includes a major axis 406 along which the head 404 should be located, as shown in FIG. 4. Once the head tracking engine 240 has initially located the head of the subject, that location can be used in conjunction with the image depth data to locate the head of the subject in subsequent frames. The head tracking engine 240 also creates a three-dimensional model of the subject's head.

The three-dimensional models of the subject's torso and head, along with their locations, are passed with the image depth data to the arm tracking engine 250. At 310, the arm tracking engine 250 uses the three-dimensional models of the subject's torso and head, along with the blob corresponding to the subject, to locate the arms of the subject. The process of locating the subject's arms is described in further detail below with reference to FIG. 5. The arm tracking engine 250, can further employ an IK solver to provide additional information for processing the location of the subject's arms.

There are several important advantages in using an IK solver to provide additional information to the tracking modules. First, the IK solver model effectively smoothes the data, thereby minimizing the effects of sensor noise. Second, the data points obtained from the tracking module necessarily correspond to pixels of value "1" on the binary mask (that is, they fall on the silhouette of the subject). There is no such restriction pertaining to the data obtained by the IK solver. To give a specific example, the subject may be standing close to the edge of the sensor's field of view. In this case, when the subject reaches out to the side, the end of the subject's arm will be out of the field of view of the sensor. In spite of this, the IK solver can compute that the subject's arm is reaching out of the field of view and return the location of the subject's hand. Obviously, there is no way to do this using only the data from the sensor. A third advantage in using the IK solver is in dealing with occlusions. For example, often, the subject's hand will occlude the sensor's view of the subject's elbow. Consequently, no data corresponding to the elbow can be sampled from the image depth data (since its location is unknown). Given the locations of the hand and shoulder, however, the IK solver is able to calculate the approximate position of the elbow as well.

The location of the arms, along with all of the information that the arm tracking engine 250 received are passed to the leg tracking engine 260. At 312, the leg tracking engine 260 locates the subject's legs. The leg tracking engine 260 uses the location of the head, torso, and arms of the subject to remove the pixels associated with the torso, the head, and each arm, from the image depth data, leaving only pixels associated with the subject's legs. Having only the pixels corresponding to the subject's legs, the leg tracking engine 260 identifies a left and a right leg. Further, the leg tracking engine 260 can use an IK solver to determine the location of the knee and ankle joints for each of the subject's legs.

Figure 5:
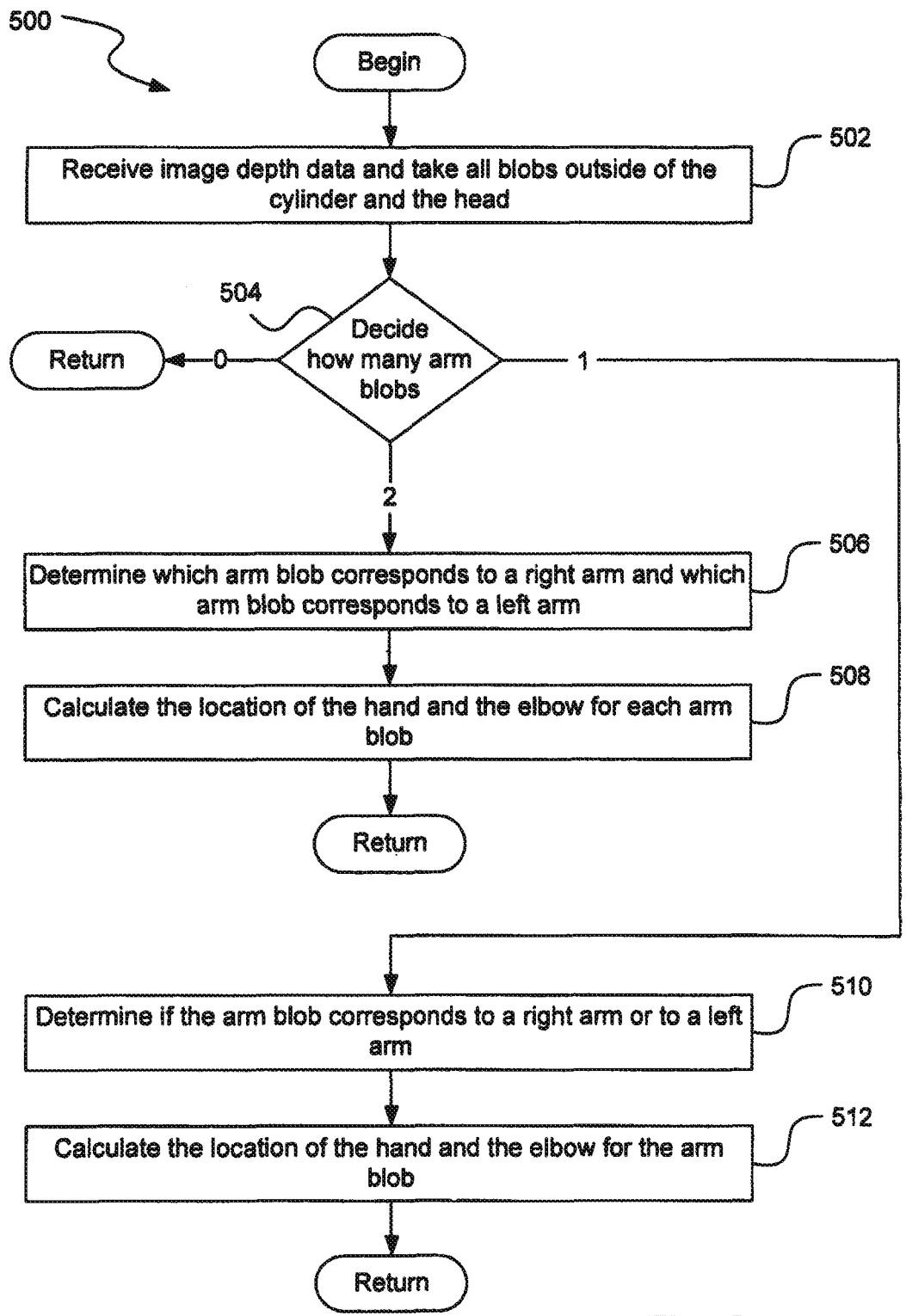
FIG. 5 is a flow diagram of an example process for modeling the arms of a human subject according to the techniques introduced here.

FIG. 5 is a flow diagram of an example process for modeling the arms of a subject according to the techniques introduced here. The process is organized as a sequence of operations in the flowchart 500. However, it should be understood that at least some of the operations associated with this process can potentially be reordered, supplemented, or substituted for while still performing the same overall technique.

In one embodiment, the arm tracking engine 250 performs the operations associated with the process 500. The arm tracking engine 250 receives the blob representing the subject, including image depth data, and the three-dimensional models representing the subject's torso and head. At 502, pixels corresponding to the subject's head and torso, which have previously been located and modeled, are removed from the image depth data. The three-dimensional nature of the image depth data allows the arm tracking engine 250 to remove only the pixels that fall within the head and torso models, leaving the pixels corresponding to objects in front of the torso and the head. As part of this step, the arm tracking engine 250 can remove other blobs that heuristically do not likely correspond to the subject's arms, for example, blobs due to the noisy nature of the sensor data. FIG. 6 depicts several examples of arm blobs obtained by using image depth data and the techniques described herein.

At 504, the arm tracking engine 250 determines how many blobs corresponding to an arm of the subject are found in the image depth data after the torso, head, and other blobs have been removed. There is a limit to the number of arm blobs that can be present in the image depth data (zero, one, or two). The arm tracking engine 250 proceeds from decision block 504 based on the number of arm blobs found. If zero arm blobs are found, 504-0, the arm tracking engine 250 returns a result of no arms and waits for the next frame of image depth data. A situation where zero arm blobs can be found happens when the subject's arms are kept extremely close to the torso, and there is insufficient resolution from the sensor in order to distinguish between the arms and the torso.

If one arm blob is found, 504-1, the process continues to 510 where the arm tracking engine 250 uses ad hoc methods to determine whether the arm blob found is the subject's right or left arm. The ad hoc method includes extracting image depth data from the arm blob to determine whether the arm blob corresponds to a right arm or a left arm. If the results using the extracted image depth data are inconclusive, additional image depth data is extracted from the arm blob and this process continues until a determination can be made. The process then continues to 512 where the arm tracking engine 250 determines, using ad hoc methods, where the subject's hand and elbow joints are, based on whether the arm blob has been identified as a right or a left arm. The ad hoc method for determining the locations of hand and elbow joints can similarly use image depth data extracted from the arm blob and continue to extract data until it can be determined where the joints are located. In one embodiment, an IK solver can provide additional information which the arm tracking engine 250 can use to identify and process the arm blob. For example, certain configurations of the hand and elbow joints are not possible for a naturally articulated human figure, and the IK solver is used to identify these impossible configurations.

If two arm blobs are found, 504-2, the process continues to 506 where the arm tracking engine 250 uses ad hoc methods to determine which blob corresponds to the subject's left arm and which blob corresponds to the subject's right arm. The process then continues to 508, where the arm tracking engine 250 determines the location of the hand and elbow joint for each arm, using the ad hoc methods described above and the image depth data from the arm blobs. In one embodiment, an IK solver can provide additional information which the arm tracking engine 250 can use to identify and process the arm blobs.

Figure 7:
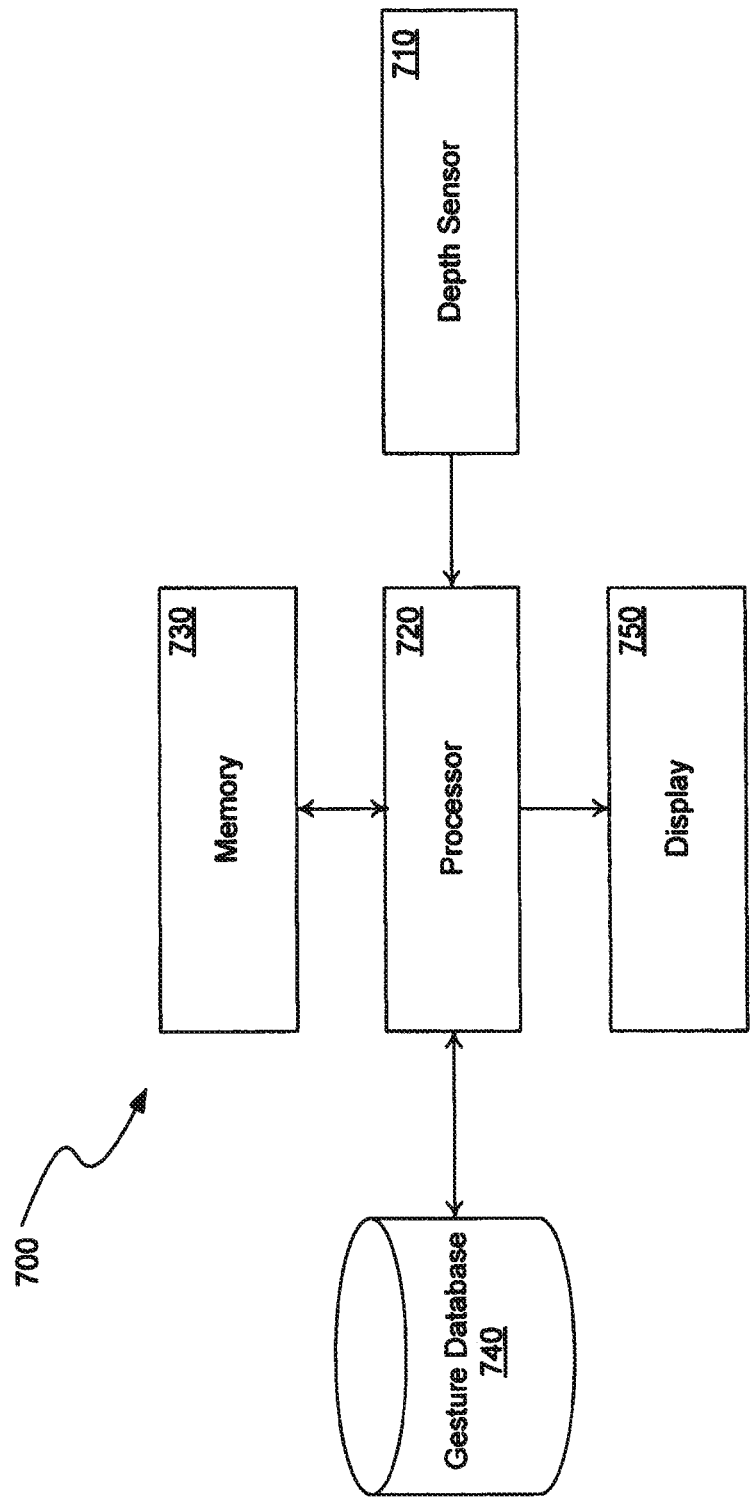
FIG. 7 is a block diagram of an example tracking system using a gesture classification system.

FIG. 7 is a block diagram of an example tracking system 700 using a gesture classification method. The tracking system 700 can be incorporated into an interactive system, for example, a video game system. The depth sensor 710 is used to capture a subject's movements. The depth sensor 710 can take simultaneous color and depth images of the subject, and the images are sent to the processor 720 for processing, as depicted by the arrow in the diagram.

The processor 720 performs the techniques described above, corresponding to the various engines of the tracking system 200, to create a model of the subject. The three-dimensional model created using these techniques includes the color information and is subsequently stored in the memory 730 for later processing. When a minimum number of images have been acquired, processed, and stored, the processor 720 compares the movements of the subject, based on the stored images, with gestures from a gesture database 740. The processor 720 calculates a similarity measure between the stored images and the gestures from the gesture database 740. The processor 720 then identifies the gesture from the gesture database 740 that has the highest similarity measure. The processor 720 can then cause the gesture to be displayed to the user on display 750. In one embodiment the processor causes the memory 730 to delete the acquired images, and the depth sensor 710 to acquire additional images. The gesture recognition process can then be repeated.

In one embodiment, the processor 720 also runs the interactive program which is displayed to the user through a display 750. The display 750 presents an image of the subject performing the gesture identified by the processor 720. The image of the subject is incorporated into the virtual environment of the interactive program which is also presented by display 750.

Figure 8:
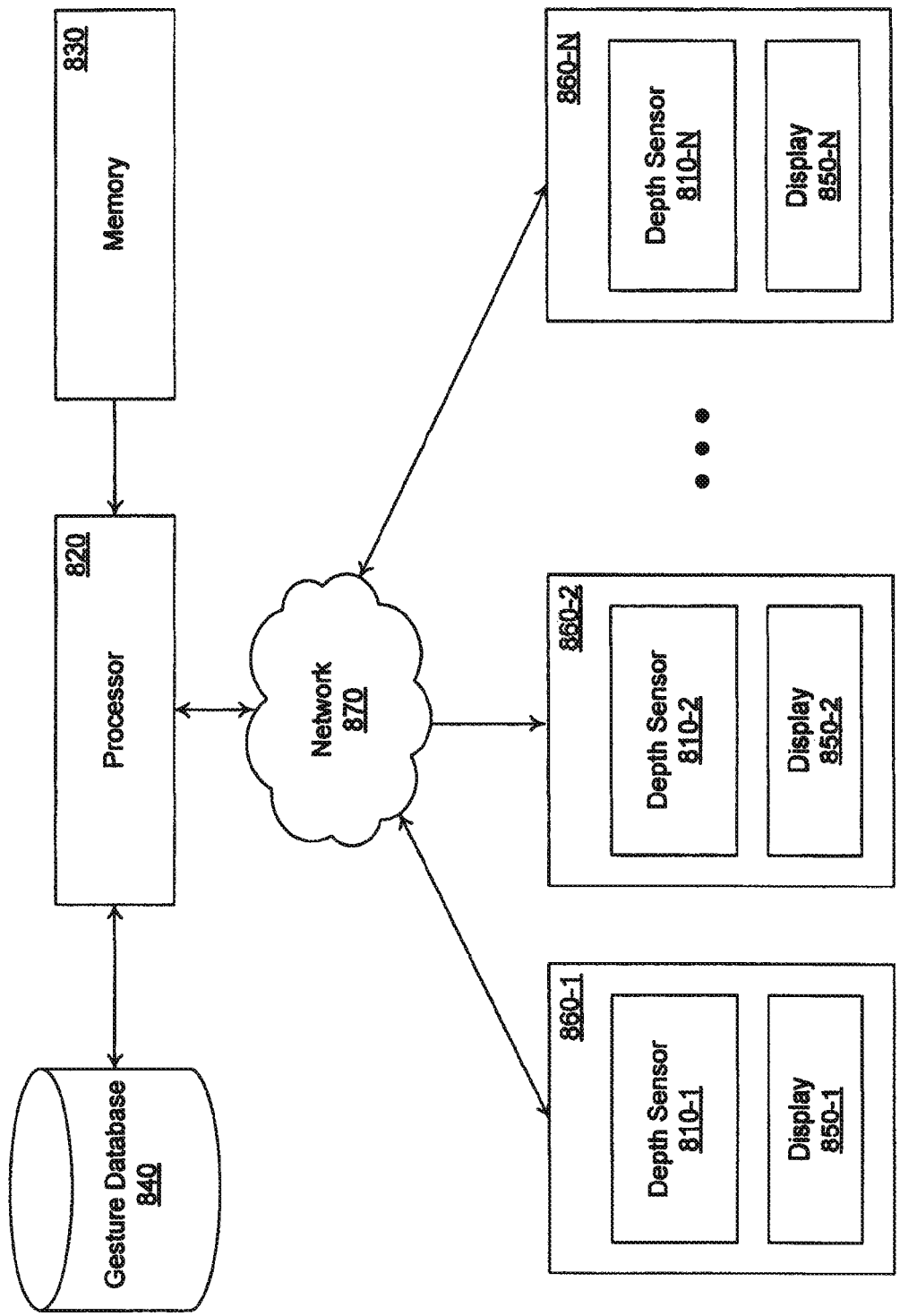
FIG. 8 is a block diagram of an example tracking system and gesture classification system incorporated into an interactive program accessed by multiple users over a network.

FIG. 8 is a block diagram of an example tracking system and gesture classification system 800 incorporated into an interactive program accessed by multiple players over a network.

Multiple players may access the same interactive program from different locations. FIG. 8 shows three separate sites 860-1, 860-2, and 860-N from which users access the same virtual environment, but any number of users from any number of sites may participate in the interactive program. Each site 860-1, 860-2, and 860-N has depth sensor equipment 810-1, 810-2, and 810-N which take simultaneous color and depth images of a user at that location, and the images are sent to the processor 820, over network 870, for processing. In the preferred embodiment, if more than one user is at the same site, each user is tracked by a separate depth sensor. All of the users at the same site may share a display or have their own individual displays 850-1, 850-2, and 850-N. However, all the displays 850 are capable of showing images of all the users at the different sites participating in the same virtual environment.

The images obtained by the depth sensor equipment 810-1, 810-2, and 810-N from the different sites 860-1, 860-2, and 860-N are sent over a network 870 to the processor 820. While the processor 820, memory 830, and gesture database 840 are shown in FIG. 8 as being located remotely from the user sites 860-1, 860-2, and 860-N, any of the processor, memory, and/or gesture database can be located at any of the sites. The processor 820, memory 830, and the gesture database 840 function in the same manner as described above, but with multiple users participating in the same interactive program. The processor 820 processes the images captured for each user. In one embodiment, the processor 820 can have sub-processors dedicated to individual users, and each sub-processor can access an independent memory within the memory 830. It will be apparent to a person skilled in the art that different hardware structures may implement the functions of the processor 820 and the memory 830 to perform the process efficiently.

In one embodiment, the processor 820 also runs the interactive program which the users are experiencing virtually through the displays 850-1, 850-2, and 850-N. The images of all of the users are incorporated into the virtual environment of the interactive program which is presented by each display 850-1, 850-2, and 850-N. Signals are sent by the processor 820 to the displays 850-1, 850-2, and 850-N over the network 870.

Figure 9:
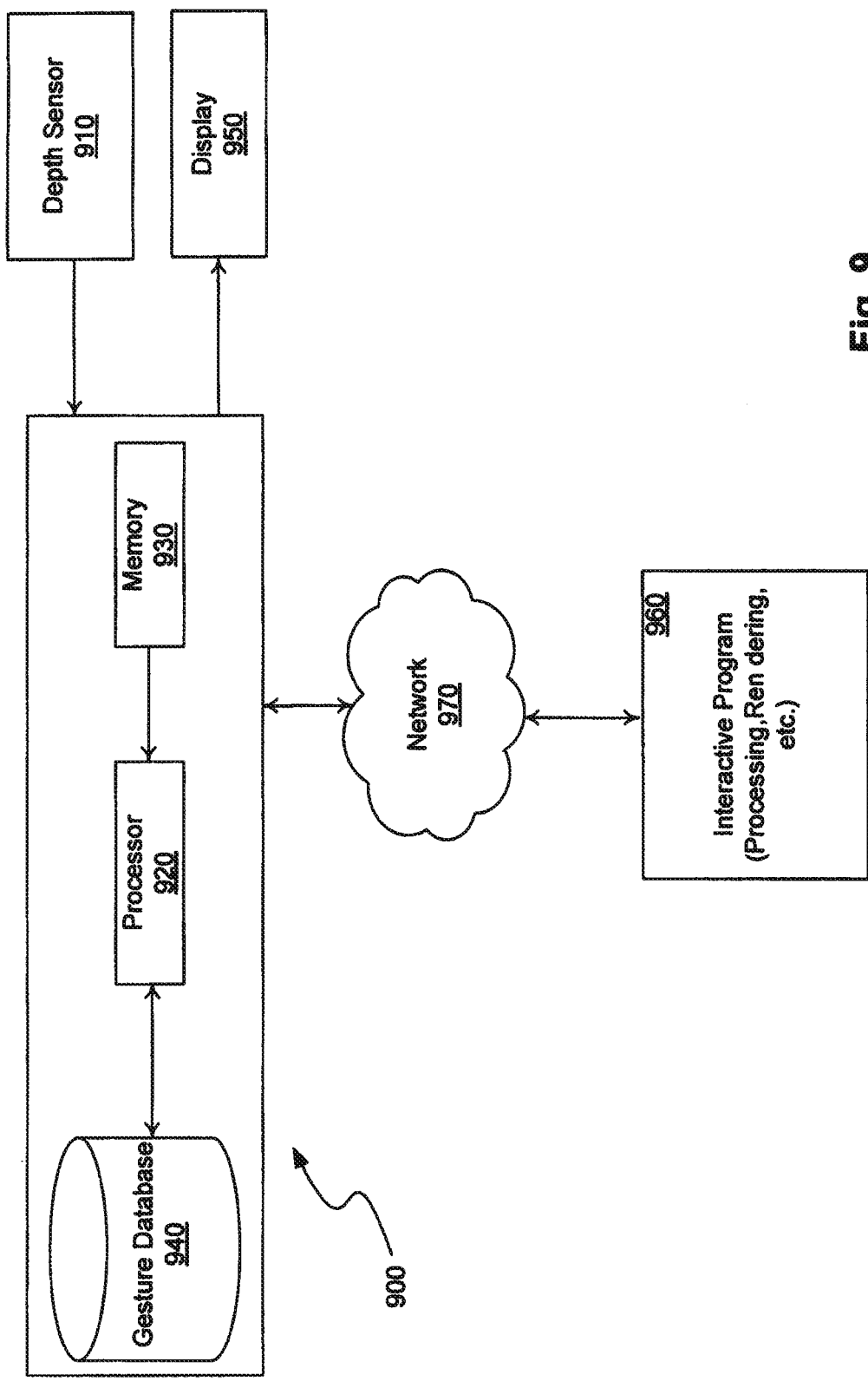
FIG. 9 is a block diagram of an example tracking system and gesture classification system incorporated into an interactive program accessed by a player over a network

FIG. 9 is a block diagram of an example tracking system and gesture classification system incorporated into an interactive program accessed by a player over a network. The system of FIG. 9 includes a local system 900 having a depth sensor 910, a processor 920, a memory 930, a gesture database 940, and a display 950. The local system 900 connects to an interactive program 960 through a network 970.

Multiple players can access the same interactive program 960 from different locations. FIG. 9 shows one local system connected through network 970 to the interactive program 960, but any number of users from any number of sites may participate in the interactive program. The local system 900 includes depth sensor equipment 910 which can take simultaneous color and depth images of a user at that location. The images are sent to the processor 920 for processing. The local processor 920, memory 930, and gesture database 940 function in the same manner as described above. The local system 900 creates a model of the subject, can track the movements of the subject, and/or recognize gestures by comparison to gestures in the gesture database. The processed image depth data (e.g., the location of the subject) is then sent to the interactive program 960 through the network 970. It will be apparent to a person skilled in the art that different hardware structures may implement the functions of the processor 920 and the memory 930 to perform the process efficiently.

In the example of FIG. 9, the interactive program, which the user is experiencing virtually through the display 950, is processed at a remote location and accessed through the network 970. The locally processed images of all of the users are incorporated into the virtual environment of the interactive program 960 which is sent through the network 970 and presented by the display 950.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. The words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

What is claimed is:

1. A system comprising:
   a first site having a first sensor to acquire image depth data; and
   a processor communicatively coupled to:
      a background manager to separate a background of an image from a foreground of the image in the image depth data to create a model of the image background;
      a subject manager to determine from the background image a subset of the image depth data that corresponds to a subject and to send image depth data that does not correspond to the subject, wherein the background manager dynamically updates the image background based on second image depth data received from the first sensor and the image depth data that does not correspond to the subject
      a subject tracking engine to create a three-dimensional (3D) model of a torso and a head of the subject based on the model of the image background and the subset of the image depth data corresponding to the subject and locate an extremity of the subject by using the 3D model of the torso and the head of the subject and the subset of the image depth data, wherein locating the extremity comprises generating an approximate position of the extremity upon a determination that data corresponding to the extremity is not included in the subset of the image depth data corresponding to the subject.

2. The system of claim 1 further comprising a memory to store the 3D model.

3. The system of claim 2 further comprising a second site, coupled to the processor, having a second sensor to acquire second image depth data.

4. The system of claim 3 wherein the background manager creates a second model of an image background from the second image depth data, the subject manager determines a subset of the second image depth data that corresponds to a second subject, and the subject tracking engine creates a 3D model of a second torso and a head of the second subject based on the model of the second image background and the subset of the second image depth data and locates an extremity of the second subject by using the 3D model of the torso and the head of the second subject and the second subset of the image depth data.

5. The system of claim 1, wherein the subject manager uses remaining image depth data to locate the extremity of the subject by detecting a blob from the remaining image depth data that corresponds to an arm, determining whether the blob corresponds to a right arm or a left arm; and calculating where a hand and an elbow are located based on the blob.

6. The system of claim 5 wherein the processor further recognizes a gesture performed by the subject.

7. The system of claim 6 further comprising a gesture database, coupled to the processor, wherein recognizing the gesture comprises the processor storing a plurality of locations of the subject and comparing the plurality of locations of the subject to gestures in a gesture database.

8. The system of claim 6 wherein the first site further comprises a display, to display the gesture to a user.

9. The system of claim 1 wherein the subject is a human.

10. A computer generated method comprising:
   receiving image depth data from an image sensor;
   separating a background of an image from a foreground of the image in the image depth data;
   creating a model of the image background from the image depth data;
   determining from the background image a subset of the image depth data that corresponds to a subject;
   dynamically updating the image background model using second image depth data received from the image sensor and the image depth data that does not correspond to the subject;
   creating a three dimensional (3D) model of a torso and a head of the subject based on the updated model of the image background and the subset of the image data corresponding to the subject; and
   locating an extremity of the subject using the 3D model of the torso and the head of the subject of the image depth data, including generating an approximate position of the extremity upon a determination that data corresponding to the extremity is not included in the subset of the image depth data corresponding to the subject.

11. The method of claim 10 wherein the image depth data is received via a network.

12. The method of claim 10 further comprising:
acquiring depth data for a plurality of sequential images; and
tracking a torso location of the subject in the sequential images.

13. The method of claim 12 further comprising determining a pelvis location of the subject based on the torso location from the two-dimensional torso tracking engine.

14. The method of claim 13 further comprising creating a 3D model of the torso of the subject in the sequential images based on the image depth data and the torso location.

15. The method of claim 10 wherein the 3D model of the torso of the subject is a parametric cylinder model.

16. At least one non-transitory computer readable medium having instructions, which when executed causes a processor to perform:
receiving image depth data from an image sensor;
separating a background of an image from a foreground of the image in the image depth data;
creating a model of the image background from the image depth data;
determining from the background image a subset of the image depth data that corresponds to a subject;
dynamically updating the image background model using second image depth data received from the image sensor and the image depth data that does not correspond to the subject;
creating a three dimensional (3D) model of a torso and a head of the subject based on the updated model of the image background and the subset of the image data corresponding to the subject; and
locating an extremity of the subject using the 3D model of the torso and the head of the subject of the image depth data, including generating an approximate position of the extremity upon a determination that data corresponding to the extremity is not included in the subset of the image depth data corresponding to the subject.

17. The computer readable medium of claim 16 wherein the image depth data is received via a network.

18. The computer readable medium of claim 17 having further instructions, which when executed causes the processor to perform determining a pelvis location of the subject based on the torso location from the two-dimensional torso tracking engine.

19. The computer readable medium of claim 18 having further instructions, which when executed causes the processor to perform creating a tracking the 3D model of the torso of the subject in the sequential images based on the image depth data and the torso location.

20. The computer readable medium of claim 16 having further instructions, which when executed causes the processor to perform:
acquiring depth data for a plurality of sequential images, and the subject tracking engine; and
tracking a torso location of the subject in the sequential images.

* * * * *